United States Patent [19]

Marveggio

[11] 4,453,316
[45] Jun. 12, 1984

[54] MECHANISM FOR MEASURING DISTANCES ESPECIALLY THREAD DIAMETERS

[75] Inventor: Secondo Marveggio, Lausanne, Switzerland

[73] Assignee: Trimos S.A., Renens, Switzerland

[21] Appl. No.: 454,001

[22] Filed: Dec. 28, 1982

[30] Foreign Application Priority Data

Jan. 8, 1982 [DE] Fed. Rep. of Germany ....... 3200695

[51] Int. Cl.³ .............................................. G01B 3/48
[52] U.S. Cl. .............................. 33/199 R; 33/147 M; 33/143 R
[58] Field of Search ............ 33/199 R, 199 B, 147 M, 33/147 R, 147 H, 147 T, 147 J, 147 K, 147 E, 143 R, 143 M, 143 J, 143 K

[56] References Cited

U.S. PATENT DOCUMENTS

3,432,935  3/1969  Reish .................. 33/199 R

FOREIGN PATENT DOCUMENTS

14869  9/1956  Fed. Rep. of Germany .... 33/199 R
1106746  7/1955  France ............................ 33/199 R Primary Examiner—Harry N. Haroian
Attorney, Agent, or Firm—Emory L. Groff, Jr.

[57] ABSTRACT

The object to be measured (2) is placed on carrier (1). Measuring pins (7,8) can be adjusted roughly in terms of height after loosening screws (11). Sliding carriages (5,6) are guided movably by spherical guides in measurement support members (3,4) perpendicularly to the direction of measurement. Measuring pins (7,8) located in support members (3,4) which are provided with handles (13) and which are connected with sliding carriages (5,6) by means of leaf springs (14). If the laterally adjustable support member (4) is moved into the measuring position, the sliding carriages (5,6) with their measuring pins (7,8) can, within the limits of leaf springs (14), be freely centered in the pitch of the thread to be measured (2a) thus providing the ideal prerequisites for correct measurement of the thread diameter.

5 Claims, 3 Drawing Figures

MECHANISM FOR MEASURING DISTANCES ESPECIALLY THREAD DIAMETERS

This invention relates to a mechanism for measuring distances, especially of thread diameters. Known mechanisms consist of a carrier for receiving the object to be measured including two measurement supports attached to the carrier, and two scanning pins supported by the measurement supports provided with measurement inserts, whereby at least one of the measurement supports is movably arranged for measurement purposes opposite the carrier in a direction corresponding to the measuring direction.

These measurement mechanisms entail the disadvantage that, in measuring objects with an uneven surface, especially thread diameters, the scanning or measuring pins can be brought into the correct measuring position only after protracted adjustment of the object to be measured. The adjustment of the scanning or measuring members in the ideal measuring position therefore is not always possible, as a result of which precision errors may appear in the measurement.

The object of my invention is to remedy these disadvantages. For this purpose, the invention is characterized by the fact that the measuring pins are positioned to move perpendicular with respect to the mentioned measurement direction, in the measuring supports, the measuring supports being provided with adjusting members serving to guide the measuring pins into an approximate measuring position, said adjusting members coupled by means of spring members with the measuring pin so that they will, during a measurement operation, permit an adjustment leeway of the measurement inserts into the correct measuring position against the spring force of the spring members.

The mechanism permits, after a rough adjustment, the automatic centering of the measuring members in the ideal measuring position and thus decisively contributes to the facilitation of measuring operation especially in the case of thread diameters.

A preferred embodiment of the invention will now be described with reference to the attached drawing wherein.

Figure 1:
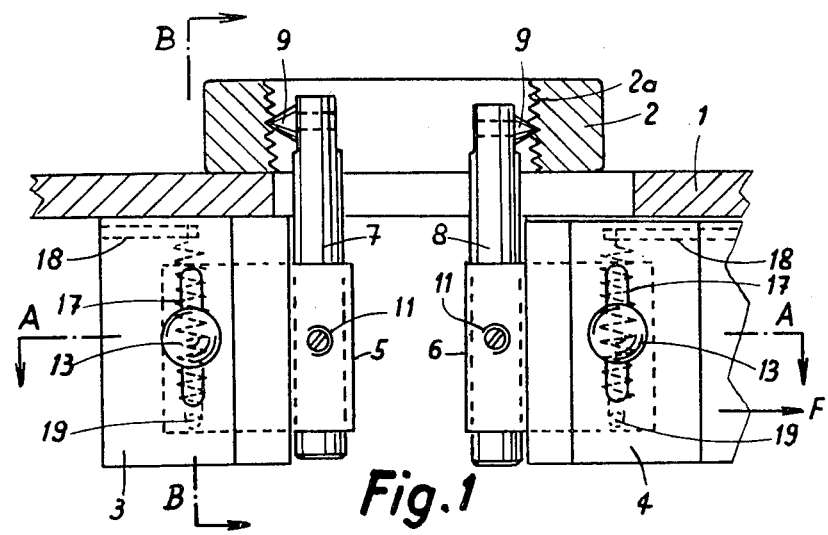
FIG. 1 is a front elevational view of the invention, partly in section.
Figure 2:
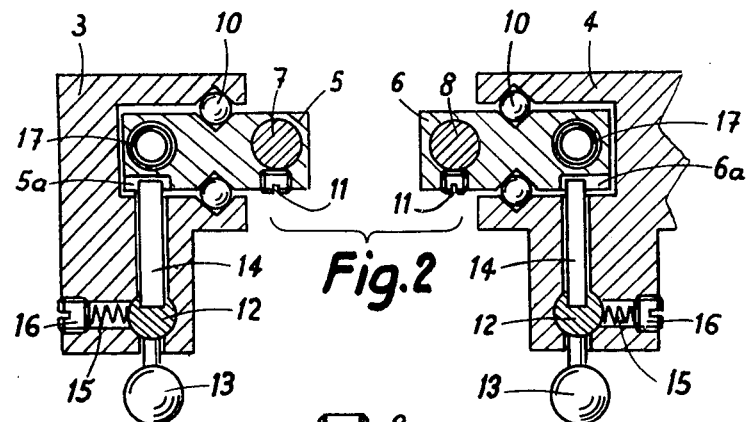
FIG. 2 is a cross-section taken on the line A—A of FIG. 1.
Figure 3:
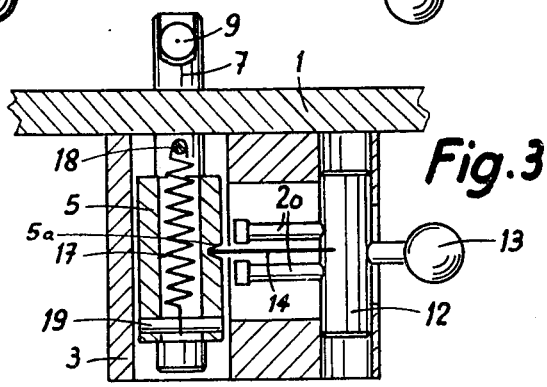
FIG. 3 is a cross-section taken on the line B—B of FIG. 1.

The object to be measured is placed on a carrier 1 (FIG. 1) and in this case is a ring 2 provided with an inside thread 2a. Two measuring pins 7 and 8 engage with their measuring inserts 9 the thread 2a which is to be measured, in a known manner. They are positioned in sliding carriages 5 and 6 which can be adjusted in terms of height and which are retained by means of screws 11. By means of spherical guides 10, sliding carriages 5 and 6 are movably guided in support members 3 and 4, perpendicularly to the measuring direction. In the measuring support members 3 and 4, there are located pins 12 (FIGS. 2 and 3) which are provided with handles 13 and leaf springs 14. The ends of springs 14 engage in recesses 5a and 6a in sliding carriages 5 and 6. Stops 20 (FIG. 3), recessed into pin 12, limit the flexing of the springs and thus protect them against overload.

After adjustment of pins 12 by means of handles 13, the pins are retained in position by the force of the springs 15 (FIG. 2) which can be adjusted by means of screws 16.

Springs 17 (FIGS. 1 and 3), on the one hand attached to pin 18 of support members 3 and 4 and on the other hand, attached to spring 19 of sliding carriages 5 and 6 assure that the weight of sliding carriages 5, 6 and measuring pins 7,8 will be approximately balanced out.

The support member 3 is firmly connected with carrier 1 while the support member 4 is movably positioned in the direction of measurement. Support member 4 is connected in a known manner with a measuring mechanism which is not shown and which indicates the extent of movement of the support member 4.

Measurement itself is accomplished in that, after withdrawal of support member 4 (to the left of FIG. 1) the object 2 to be measured is placed in carrier 1. Measuring pins 7 and 8 can now be roughly adjusted in terms of height after loosening and retightening of screws 11. Finer adjustment can be achieved by means of both handles 13, which permit as much free play for the sliding carriages 5 and 6 as springs 14 allow. After proper adjustment, support member 4 is moved into measuring position and if it is impacted by measuring force F, then sliding carriages 5 and 6 and, with them, measuring inserts 9, can, within the limits or leeway of springs 14, be freely centered in the pitch of thread 2a. In this way, we have the ideal prerequisites for correct measurement of the thread diameter.

The example given shows the measurement of inside threads. By correspondingly selecting the measuring inserts, one can, of course, also measure outside threads in a corresponding manner. The measurement of diameters of all kinds, for example, those of perforations, is likewise possible.

I claim:

1. Mechanism for measuring distances particularly thread diameters, comprising a carrier (1) for receiving the object to be measured, two measuring support members (3,4) attached to said carrier, measuring pins (7,8) mounted in each of said measuring support members, said pins including measuring inserts (9), at least one of said measuring support members movably mounted for measurement purposes opposite said carrier in a direction corresponding to the measurement direction, characterized in that said measuring pins (7,8) positioned in said measuring support members (3,4) are movable perpendicularly to said measurement direction, said measuring support members (3,4) including adjusting members (12,13) mounted therein to guide said measuring pins (7,8) into an approximate measurement position, spring members (14) connecting said adjusting members (12,13) with said measuring pins (7,8) so that, during a measurement operation, they permit a centering leeway of said measurement inserts (9) into the correct measuring position against the spring force of the spring members (14).

2. Mechanism for measuring distances according to claim 1, wherein said measuring pins (7,8) are positioned in said measuring support members (3,4) by means of roller guides (10).

3. Mechanism for measuring distances according to claim 2, wherein said measuring pins (7,8) are mounted in longitudinally adjustable sliding carriages (5,6) which in turn are movably positioned in said measuring support members (3,4).

4. Mechanism for measuring distances according to claim 3, wherein said adjusting members (12,13), positioned in measuring support members (3,4) are braked so that they will be retained in the adjusted position.

5. Mechanism for measuring distances according to claim 4, wherein the weight of said measuring pins (7,8) and of the sliding carriages (5,6) connected with them, is balanced out by correspondingly arranged springs (17).

* * * * *